United States Patent
Jitaru et al.

(10) Patent No.: US 10,146,281 B2
(45) Date of Patent: Dec. 4, 2018

(54) METHOD AND APPARATUS FOR LOAD IDENTIFICATION

(75) Inventors: Ionel Jitaru, Tucson, AZ (US); Bogdan Tudor Bucheru, Tucson, CA (US); Marco Davila, Tucson, AZ (US)

(73) Assignee: DELTA ELECTRONICS THAILAND PUBLIC COMPANY LIMITED, Samutprakam (TH)

( * ) Notice: Subject to any disclaimer, the term of this patent is extended or adjusted under 35 U.S.C. 154(b) by 412 days.

(21) Appl. No.: 13/199,477

(22) Filed: Aug. 31, 2011

(65) Prior Publication Data

US 2012/0119714 A1    May 17, 2012

Related U.S. Application Data

(60) Provisional application No. 61/402,489, filed on Aug. 31, 2010.

(51) Int. Cl.
*G06F 1/26* (2006.01)
*G01D 4/00* (2006.01)
*H02J 1/00* (2006.01)

(52) U.S. Cl.
CPC .............. *G06F 1/26* (2013.01); *G01D 4/002* (2013.01); *H02J 1/00* (2013.01); *Y02B 90/241* (2013.01); *Y04S 20/32* (2013.01); *Y04S 20/38* (2013.01)

(58) Field of Classification Search
CPC ....................................................... G06F 1/263
See application file for complete search history.

(56) References Cited

U.S. PATENT DOCUMENTS

| | | | |
|---|---|---|---|
| 1,876,451 A | | 9/1932 | Telefunken |
| 4,301,404 A | | 11/1981 | Ley |
| 5,570,002 A | * | 10/1996 | Castleman ................. 323/283 |
| 5,717,325 A | | 2/1998 | Leeb et al. |
| 6,211,681 B1 | | 4/2001 | Kagawa et al. |
| 2003/0146755 A1 | | 8/2003 | Kitazawa et al. |
| 2004/0119576 A1 | | 6/2004 | Nakao |
| 2004/0232845 A1 | | 11/2004 | Baarman |

(Continued)

FOREIGN PATENT DOCUMENTS

DE      10112892 A2   10/2002
EP      0507360 A2    10/1992
(Continued)

OTHER PUBLICATIONS

Masato Chigira et al: "Small-size light-weight transformer with new core structure for contactless electric vehicle power transfer system", Energy Conversion Congress and Exposition (ECCE), 2011 IEEE, IEEE, Sep. 17, 2011, pp. 260-266.

(Continued)

*Primary Examiner* — Kim Huynh
*Assistant Examiner* — Joshua Neveln
(74) *Attorney, Agent, or Firm* — Vector IP Law Group; Robert S. Babayi

(57) ABSTRACT

A load communication device and method is provided, that identifies and transmits to a PSU the load requirement to operate a load device that is powered by the PSU, by analyzing the characteristics of current applied to the load device by a given input voltage generated by the PSU. The load communication device is configured to transmit between the PSU and the load device solely over the 2 wire cable that extends between the PSU and the load device.

22 Claims, 19 Drawing Sheets

(56) References Cited

U.S. PATENT DOCUMENTS

| | | |
|---|---|---|
| 2005/0140482 A1 | 6/2005 | Cheng |
| 2006/0005055 A1* | 1/2006 | Potega ................... 713/300 |
| 2006/0085658 A1* | 4/2006 | Allen et al. ............. 713/310 |
| 2007/0076459 A1 | 4/2007 | Limpkin |
| 2007/0145949 A1 | 6/2007 | Matsushima et al. |
| 2009/0310384 A1* | 12/2009 | Sharifipour ......... H02M 1/10 |
| | | 363/13 |
| 2010/0308939 A1 | 12/2010 | Kurs |
| 2011/0096446 A1* | 4/2011 | Croft ........................ 361/56 |

FOREIGN PATENT DOCUMENTS

| | | |
|---|---|---|
| EP | 2172952 A1 | 4/2010 |
| EP | 2196351 A1 | 6/2010 |
| GB | 2407717 A | 5/2005 |
| GB | 2458476 A | 9/2009 |
| JP | 2009283281 A | 12/2009 |
| WO | 9948130 A1 | 9/1999 |
| WO | 0116995 A1 | 3/2001 |
| WO | 2008140333 A2 | 11/2008 |
| WO | 2009111597 A2 | 9/2009 |
| WO | 2010/090538 A1 | 8/2010 |
| WO | 2010090538 A1 | 8/2010 |
| WO | 2010090539 A1 | 8/2010 |
| WO | 2011148289 A2 | 12/2011 |
| WO | 2012008693 A2 | 1/2012 |
| WO | 2012/018268 A1 | 2/2012 |
| WO | 2012018268 A1 | 2/2012 |

OTHER PUBLICATIONS

European Patent Office Supplementary European Search Report issued in Application No. EP 11822253.8, dated Mar. 14, 2016.

European Patent Office Search Report, dated Jan. 13, 2014, Application No. EP 13405057.4.

* cited by examiner

METHOD AND APPARATUS FOR LOAD IDENTIFICATION

RELATED APPLICATION/CLAIM OF PRIORITY

The present application is related to and claims priority from provisional application Ser. No. 61/402,489, filed Aug. 31, 2010, and entitled "Method and Apparatus for Load Identification", which provisional application is incorporated by reference herein.

INTRODUCTION

While Power Supply Units (PSU) are becoming more flexible and more intelligent, the mobile devices that are powered up by them are diversifying a lot, having different characteristics. Each consumer device is coming with its own PSU, fact that makes transportation difficult and reduces the mobility of the devices.

A universal PSU should be able to adapt its output characteristics to varied load devices requirements. Many today's PSU are already capable of such adaptation and their flexibility will increase in the future. However, the information regarding the load device characteristics have to be transferred from the load to the PSU. No human intervention or minimum intervention should be involved in order to facilitate the information transfer. The load devices have to be intelligent in order to communicate to the PSU without human intervention. For load devices without intelligence, a buffer device has to be added in order to facilitate the load recognition by the PSU and human intervention is required to make the selection.

In all cases means of communication between PSU and load devices are necessary. Radio signal and infrared beam are popular means of communication; however, they are complicated and expensive. Communication through electric connection is much cheaper and reliable; therefore a supplementary electrical connection between PSU and load devices is necessary in order to transfer information. Usually a minimum two wire electrical connection is used for power transfer between PSU and load device (two-wire power cable) and this is the cheapest way of power transfer. Hence a third wire or more wires are necessary to establish the information transfer by electrical connection means. Prior art describes various ways of communication by dedicated electrical connection. The information can be transferred in analog format, digital format or combinations of the two.

SUMMARY OF THE PRESENT INVENTION

The object of the present patent is a method and apparatus for transferring information between PSU and load devices by electrical means, without using any supplementary electrical connection but the power wires (e.g. the 2 wire cable that extends between the PSU and the load devices). The PSU can be any of the known types: DC-DC, AC-DC, AC-AC and DC-AC.

In accordance with a basic aspect of the present invention, a load communication device is provided that identifies and transmits to a PSU the load requirement to operate a load device that is powered by the PSU, by analyzing the characteristics of current applied to the load device by a given input voltage generated by the PSU.

According to a preferred embodiment, the load communication device is configured to transmit between the load device and the PSU solely over the 2 wire cable that extends between the PSU and the load device. The load communication device may include an intelligent tip (iTip) forming part of the load, or an iTip that is physically outside the load, located between the PSU and the load and in communication with each of the PSU and the load over the 2 wire cable that extends between the PSU and the load device. The iTip may have a stored library of the voltage-current-time characteristics for one or more different loads that are used to identify the actual load. For example, the PSU may be configured to deliver an initial low output voltage, voltage level sufficient to bias an iTip in circuit communication with the PSU and the load, but far from the operation voltage level required by the load device; therefore the load device is drawing no power from the PSU while the iTip is biased and functional. For example, 1 to 2 volts delivered from the PSU are sufficient for biasing the iTip while the load device operates at voltages above 3 volts.

In one version of the invention, the load communication device (iTip) is physically outside of PSU and communicates with the PSU during the low voltage state of the PSU output.

In more specific aspects of the present invention, (a) communication during low state voltage is done by coding the data in analogue and/or digital format, (b) the communication during low state voltage is done in different ways such as (i) coding the data in voltage, (ii) coding the data in current, (iii) coding the data in time, and/or (iv) coding the data in frequency. In addition, the communication during low state voltage is effected by transferring one, two or more load characteristics. Moreover, communication during low state voltage is protected by a switch against the back bias voltage of the battery of the load. Still further, communication during low state voltage is done by means of a high frequency filtered path while the power transfer between PSU and load is done means of low frequency filtered path using the same 2-wire cable.

In another embodiment of the present invention, the load communication device (iTip) is physically outside of PSU and communicates with the PSU during the high voltage state of the PSU output by clamping the maximum output voltage of the PSU.

Additional features of the present invention will be apparent from the following detailed description and the attached drawings.

DETAILED DESCRIPTION

As described above, the present invention relates to a method and apparatus of information transfer between load devices and PSU by electrical means, without using any supplementary electrical connection but the power wires (e.g. the 2 wire cable that extends between the PSU and the load devices). The PSU can be any of the known types: DC-DC, AC-DC, AC-AC and DC-AC, and in accordance with a basic aspect of the present invention, a load communication device is provided that identifies and transmits to a PSU the load requirement to operate a load device that is powered by the PSU, by analyzing the characteristics of current applied to the load device by a given input voltage generated by the PSU. The principles of the present invention are described herein in connection with several examples, and from that description, the manner in which the present invention can be practiced will be apparent to those in the art.

Figure 1:
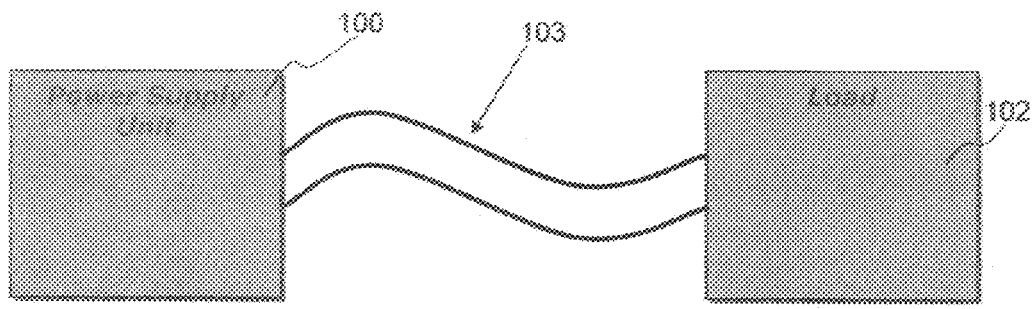
FIG. 1 is a schematic illustration of a classical connection between a PSU and load devices using two-wire power cable.
Figure 2:
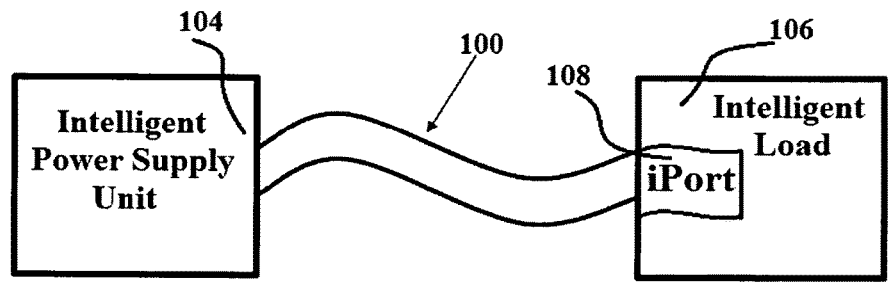
FIG. 2 schematically illustrates the connection between an intelligent PSU and intelligent load device using a two-wire power cable, where the information transfer is facilitated by an intelligent port present in the load device, according to the principles of the present invention.
Figure 3:
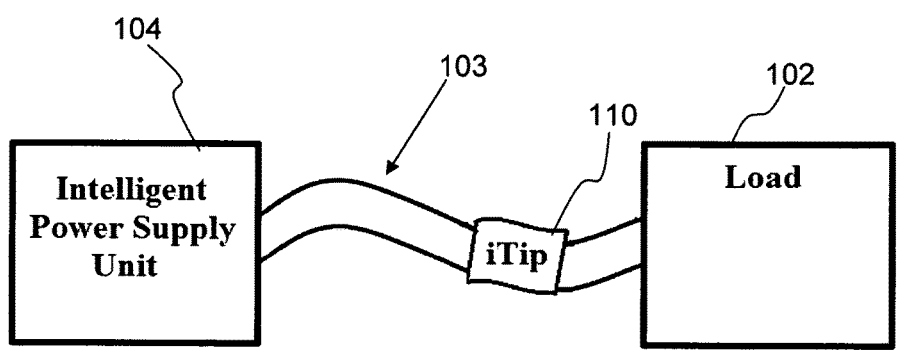
FIG. 3 schematically illustrates the connection between intelligent PSU and a classical load device, where an intelligent buffer device (intelligent tip or "iTip") is added on the power wires path, in accordance with the principles of the present invention.

In this application, reference to a "load communication device" is intended to encompass an "intelligent" tip (iTip) forming part of the load (e.g. as shown in FIG. 2), or an iTip that is physically outside the load, located between the PSU and the load and in communication with each of the PSU and the load over the 2 wire cable that extends between the PSU and the load device (e.g. as shown in FIG. 3). Also, reference to a device being "intelligent" or "smart" is intended to mean that the device has circuitry analogue or digital capable of generating and or/receiving data encoded in the manner described in this application Initially, FIG. 1 is a schematic illustration of a classical connection between a PSU 100 and a load device 102 using a two-wire power cable 103.

FIG. 2 schematically illustrates the connection between an intelligent PSU 104 and intelligent load device 106 using a two-wire power cable 103, where the information transfer is facilitated by an intelligent port, or iTip, 108 present in the load device 106, according to the principles of the present invention.

Figure 2A:
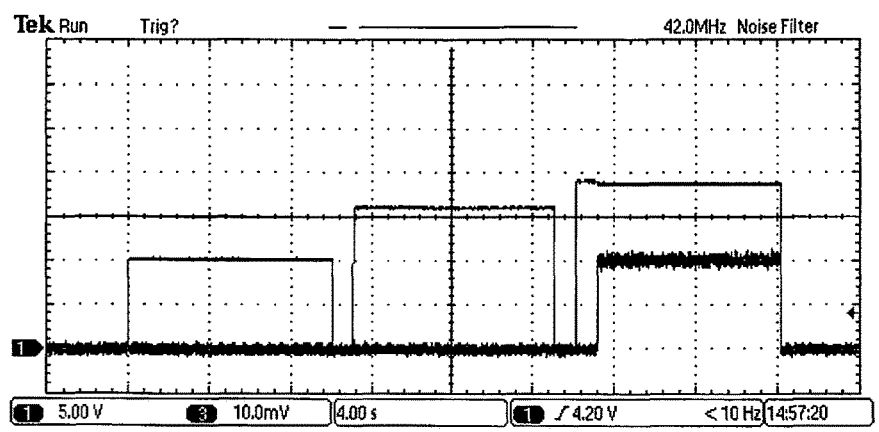
FIGS. 2A, 2B and 2C schematically illustrate how the PSU can identify the type of load and the voltage required to power that type of load, according to the principles of the present invention.
Figure 2B:
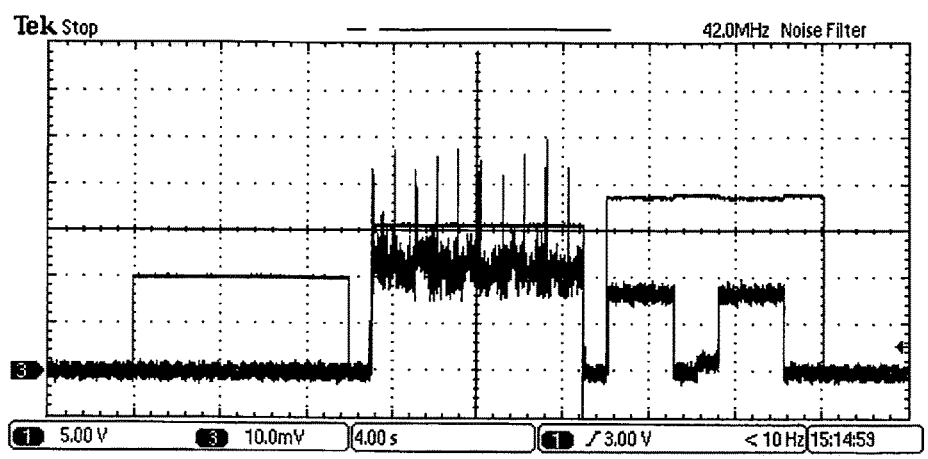
Figure 2C:
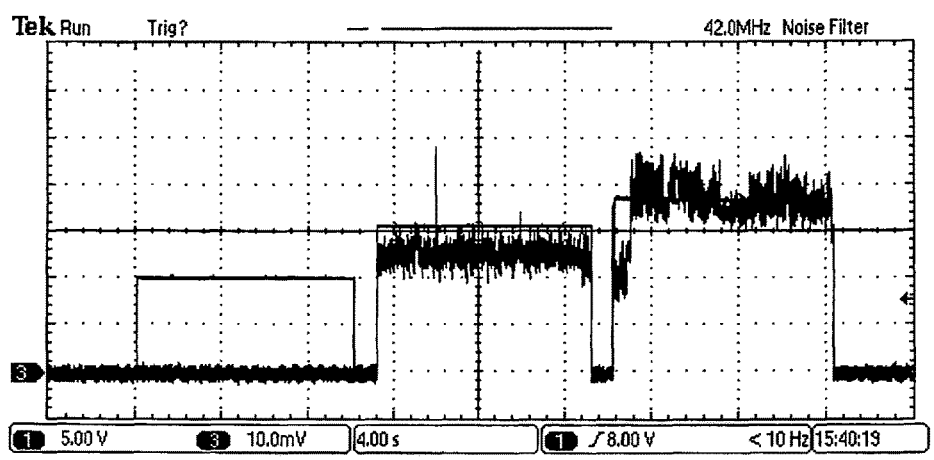

FIGS. 2A, 2B and 2C schematically illustrate an example of how the PSU 104 can identify the type of load and the voltage required to power that type of load, according to the principles of the present invention. The goal is for the PSU 104 to be able to identify the type of load and the voltage required to power that type of load. For different loads, there are discrete voltage levels, which are suitable to power it. As of today, these voltages are 5V, 8.4V, 10V, 12V, 16V and 19.5V. These are the voltage levels, which can power up most of the portable devices on the market today. That may change in the future but the general concepts described herein would apply to such voltage levels. One embodiment of this invention comprises applying step by step all the standard voltages for a defined period of time, while analyzing the current going to the load 106. The characteristic of the current going to the load for a given input voltage will vary function of the type of load, though by analyzing the characteristic of the current it can be identified if the applied voltage is the suitable voltage for that type of load. A suitable voltage level is the one, which is specified by the manufacturer for a proper operation of the load.

FIG. 2B depicts such concept. In this case, we do apply three voltage levels trying to identify which voltage level is the one suitable for the load. In this particular example, the voltage levels applied are 10V, 16V and 19V. As is presented in FIG. 2A the current going to the load has a very low level until the applied voltage is 19V. By measuring the current level for each voltage level applied, we can identify the type of load. This is a very simple approach, which may not work in all cases. Thus, FIG. 2B illustrates a case wherein the previous algorithm may not work. As can be seen the current level for the 16V applied to the load is high and the suitable voltage for that load is 19V. Analyzing the current shape when the 16V it is applied is visible that the pattern includes current spikes, which do occur quite periodically. When the suitable voltage is applied the current level is lower and in train of pulses. This is because the load in this case a computer was off. When this particular load is on the current is depicted in FIG. 2C. As shown in FIG. 2C, when the 16V voltage is applied which is not suitable for the load we do have the pattern of current spikes but not as repetitive as in FIG. 2B.

In these particular examples, we can conclude that by applying successfully different voltage levels, which are standardized for different types of load, and monitoring the current going to the load we can identify behaviors patterns, which can be utilized in identifying the suitable voltage. When more type of loads are introduced on the market, we may face the situation wherein the algorithm in identifying the suitable type of load has to be updated. This is due to the new design concept for the power supply inside of the load, which works as a buffer between the source and the electronics inside of the load. In conclusion, by applying successively the standard voltage levels with a zero voltage reset in between and a period of time long enough to address the transient behavior of the load current, we can identify clear patterns of the load current which can be utilized in identifying the suitable voltage level for that particular load.

FIG. 3 presents the connection between intelligent PSU 104 and a classical load device e.g. the type of load device shown at 102 in FIG. 1, where an intelligent buffer device (intelligent tip or "iTip") 110 is added on the power wires 103 path. This intelligent tip stores the information regarding the load characteristics and the means to communicate with the PSU. For the purpose of this patent presentation, the functions of the intelligent port (iTip 110) and the intelligent tip iTip 108 in FIG. 2) are similar.

The intelligent port/tip (iTip) can be biased (powered up) by the PSU, by the load device itself or by an external power source. For the following presentation the iTip is considered to be biased by the PSU.

For simplicity of the presentation, the PSU shown in FIGS. 1, 2 and 3 has DC output voltage and the load devices are operating with DC input power.

Intelligent Load Recognition

The intelligent PSU (e.g. PSU 104) is configured to deliver an initial low output voltage, voltage level sufficient to bias the iTip but far from the operation voltage level required by the load device; therefore the load devices is drawing no power from the PSU while the iTip is biased and functional. This assumption is met in majority of the applications; 1 to 2 volts are sufficient for biasing the iTip while the load device operates at voltages above 3 volts.

Because the load device is not operating at the low voltage necessary to bias the iTip, the communication between the PSU and the iTip is not interfered by the presence of the load device; at the same time, the load device is in a safe state, as its input voltage is under its functional range.

The data is transferred from the iTip to PSU during this low voltage state. After the data is received the iTip is turned off and the PSU is ramping up its output to the desired level. During the normal operation of the load device the iTip is disabled and it is not interfering with the load device operation. The power consumption of the iTip is negligible (very small) during the load device operation.

The information transfer can be done by coding the data in voltage, current, time (pulse with, duty cycle) and frequency. Each of this data encoding modes can be used alone or in combination with the others. The format of information can be analog or digital.

The data communicated can comprise one minimal characteristic load (example: output voltage), two characteristics (example: output voltage and current) or more characteristics (example: output voltage, output current, over-voltage protection level, under-voltage protection level, over-temperature protection level, power surge level etc.).

Time Encoding

Figure 4:
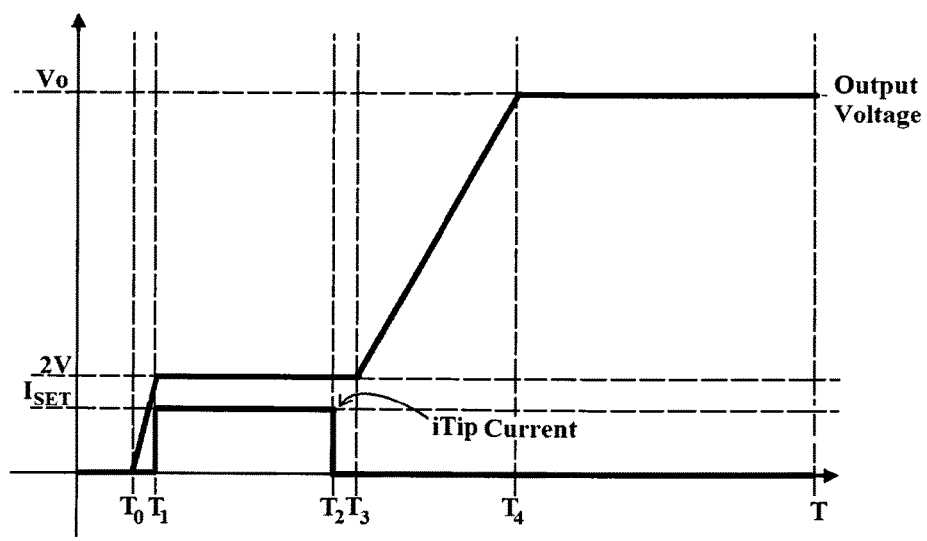
FIG. 4 schematically illustrates the PSU voltage and current when only one characteristic is transferred under the form of current pulse width, in a device or method according to the present invention.

FIG. 4 schematically illustrates the PSU voltage and current when only one characteristic is transferred under the form of current pulse width. The PSU is using the sensing of its output current as means of communication. As shown in FIG. 4, during time interval T0-T1, the PSU is increasing its output voltage from zero to 2 volts; during time interval T1-T2 the intelligent port/tip (IPT) is applying a specific current load Iset while PSU maintains its output constant and it is measuring the time interval. At the moment T2 the IPT is reducing its load current to zero and PSU is finishing counting. During time interval T2-T3 the PSU is processing the transferred data into target output voltage based on a preset algorithm. During time interval T3-T4 the PSU is ramping up its output to the target voltage. After T4 the output voltage of PSU is maintained at its target value and the load device can operate properly.

Figure 5:
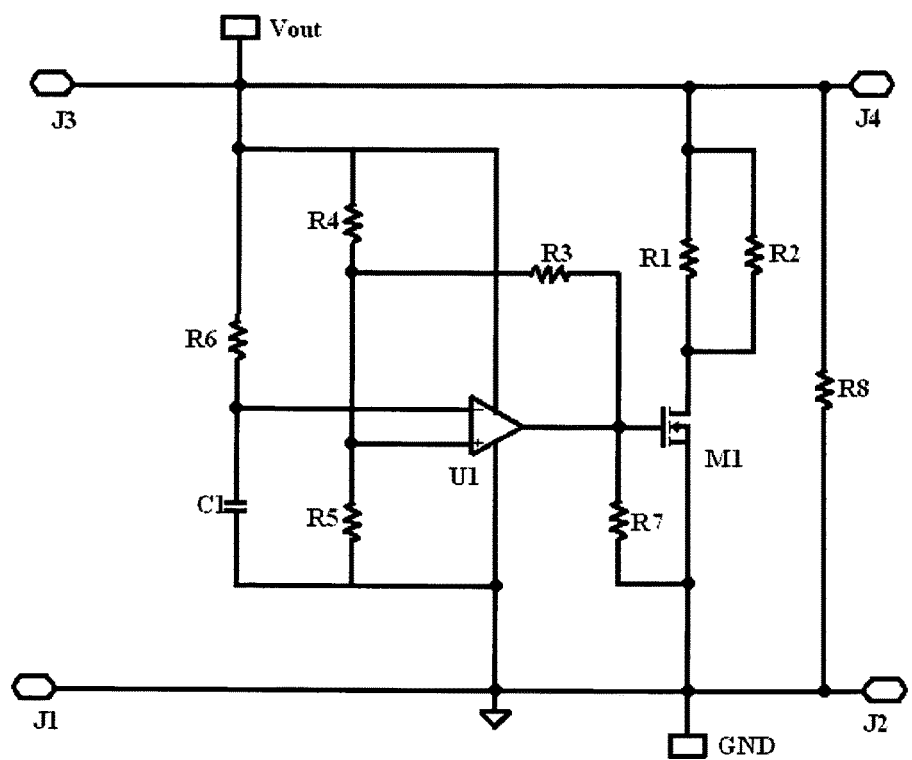
FIG. 5 schematically illustrates an example of the circuitry that produces iTip function, in a device and/or method according to the present invention.

FIG. 5 presents one possible implementation of the circuitry that produces iTip function, in accordance with the principles of the present invention. In the circuitry of FIGS. 5, J1 and J2 are the ITIP connections to the negative power wire (GND) and J3 and J4 are the ITIP connections to the positive power wire (Vout). Once the bias voltage is applied by the PSU, a positive reference voltage dictated by R4 and R5 resistive divider is applied to the non-inverting input of Operational amplifier U1, while the inverting input of U1 is held low to ground because C1 capacitor is initially discharged. U1 output state becomes high, turning on M1 mosfet transistor. The current flows from Vout to GND through R1, R2 and M1; therefore a load current is applied to PSU output. This condition last until C1 is charged up to the same potential as the one set as reference by the R4 and R5. Once the C1 voltage exceeds the reference voltage, U1 output switch to GND; therefore it is turning off M1 and terminates the flow of current from PSU output. The charging time of C1 is set by R6 resistor. The time of current flowing is set by choosing C1 and R6 values.

Figure 6:
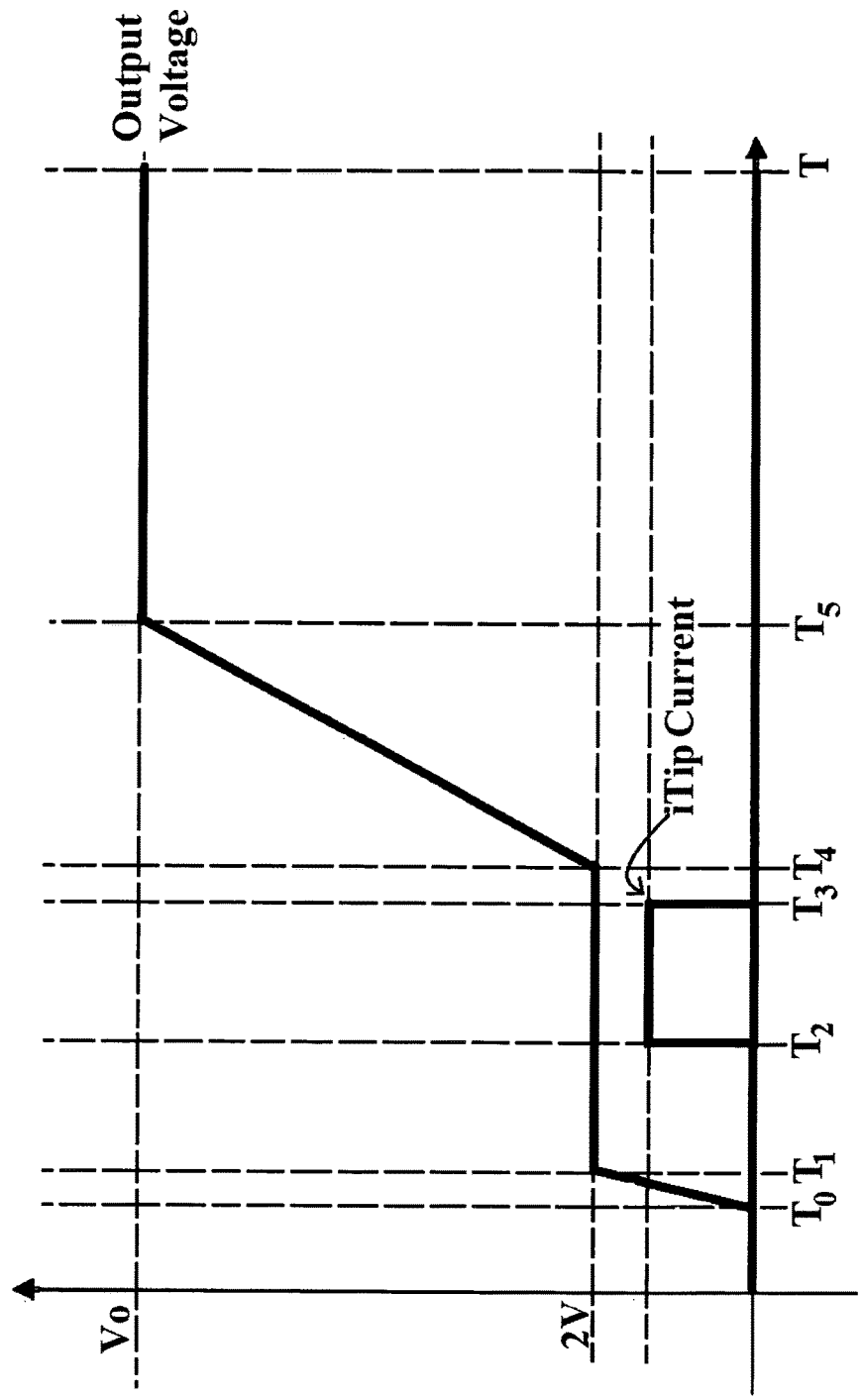
FIG. 6 is a schematic example of an implementation of the time encoding method of the present invention; where a delay was inserted between the moment T1 and the moment the iTip is applying a load current.

A second implementation of the time encoding method is schematically presented in FIG. 6, where a delay was inserted between the moment T1 and the moment the IPT is applying a load current. The duration of this delay is itself characteristic information. Therefore two characteristic data can be communicated from ITIP to PSU, one encoded into the T1-T2 delay, the second encoded into T2-T3 load current duration.

Frequency Encoding

Figure 7:
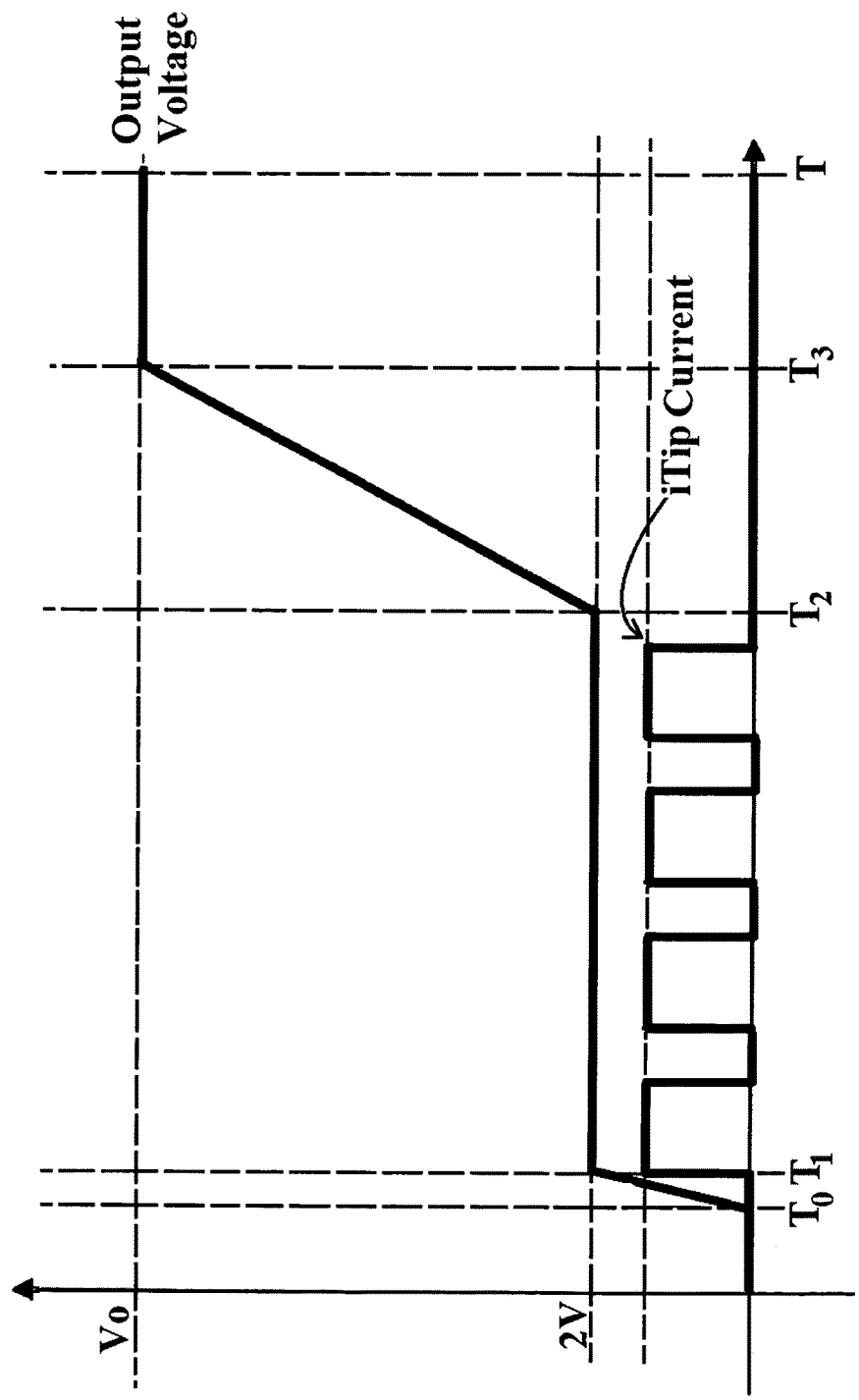
FIG. 7 schematically illustrates the PSU voltage and current when iTip is transferring data encoded into load current frequency, in accordance with the present invention.

FIG. 7 schematically presents the PSU voltage and current when IPT is transferring data encoded into load current frequency. The duty-cycle of the iTip current can be used to communicate a second characteristic of the load device.

Current Amplitude Encoding

Figure 8:
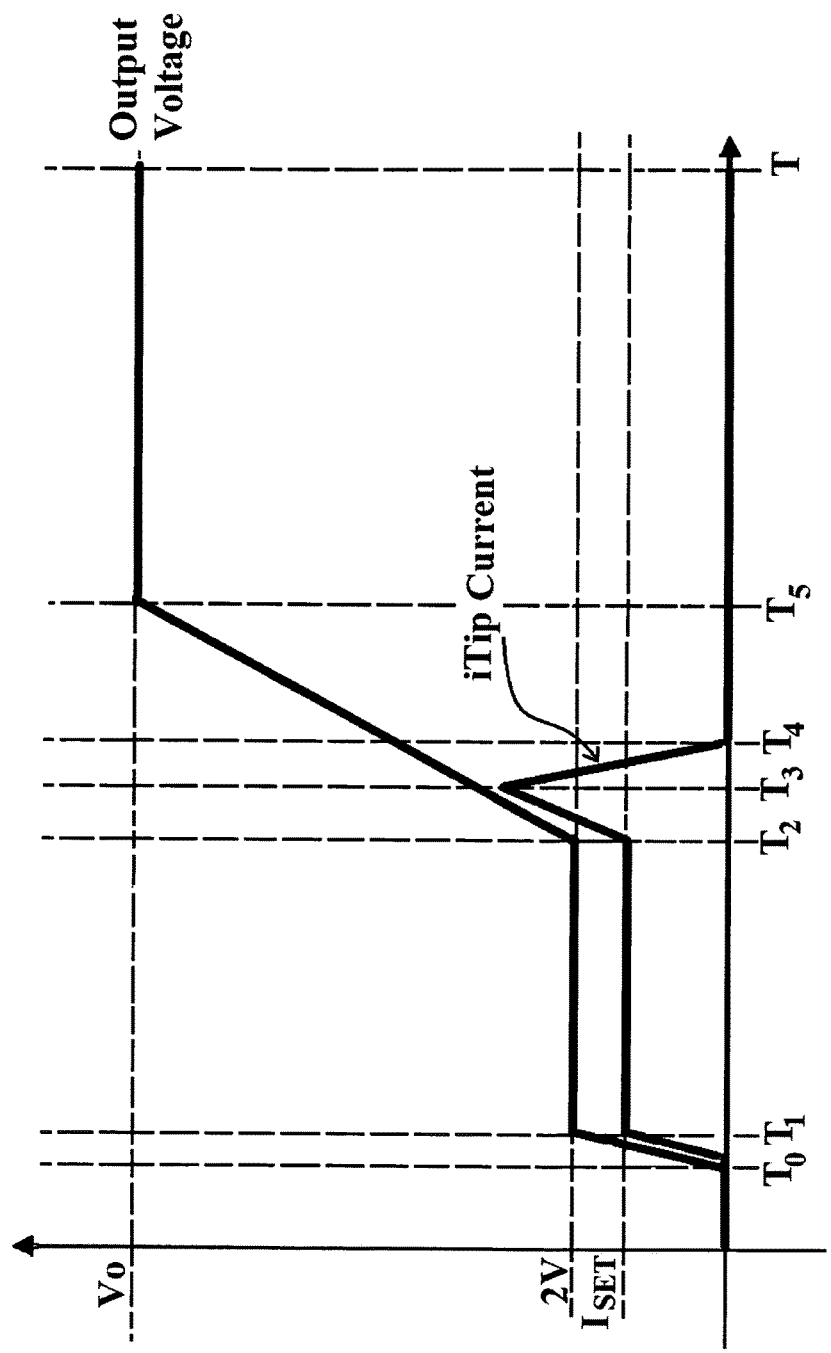
FIG. 8 schematically illustrates the PSU voltage and current when iTip is transferring one characteristic information base on the amplitude of the load current ISET.

FIG. 8 schematically presents the PSU voltage and current when iTip is transferring one characteristic information base on the amplitude of the load current ISET. Once PSU receive the data and its ramping up its output voltage the iTip is self-turning off (T3-T4). After T5 the output voltage reaches the target level and the load device can operate.

Figure 9:
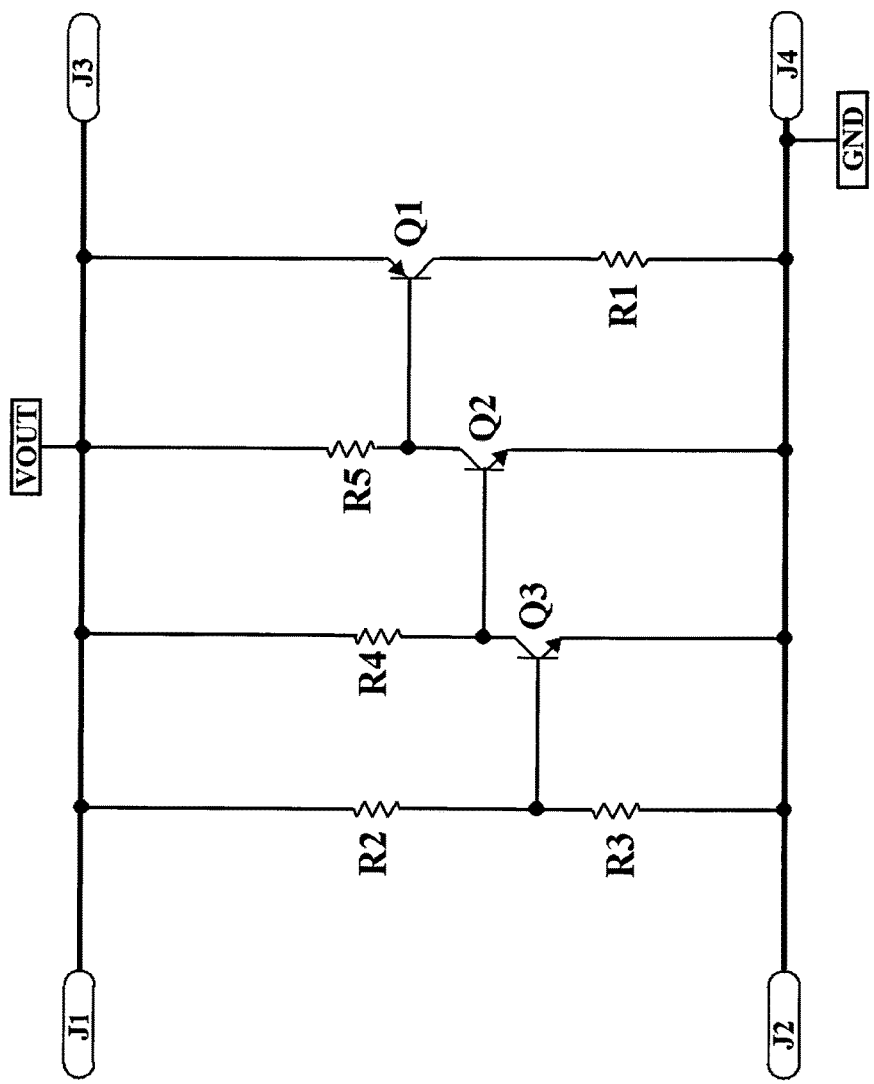
FIG. 9 schematically illustrates circuitry for producing the current amplitude encoding method, according to the principles of the present invention.

FIG. 9 schematically illustrates circuitry for producing the current amplitude encoding concept, according to the principles of the present invention. As shown in FIG. 9, once the bias voltage is applied from PSU, transistor Q2 is turn on by the current injected in its based by R4. The Q2 collector current is polarizing the base-emitter junction of Q1, therefore Q1 is on in a saturated state. Its collector current is limited by resistor R1. Hence the current amplitude sink from PSU is controlled by R1. As long as the PSU voltage maintains the low bias voltage Q3 is off, because R2 and R3 are chosen to deliver a base voltage lower than the activation level. After the PSU has received the information encoded in the IPT current, its voltage is rising in order to reach the target demanded for the load device (after T2). At T3 the PSU voltage has increased enough for the base voltage of Q3 to become active. As PSU output voltage continues to increase, Q3 becomes more active, its collector current reducing he base current of Q2, consequently reducing the collector current of Q1 (T3-T4). At the moment T4 the current through Q1 becomes zero; the only remaining current flowing through IPT is that of Q3, which is negligible.

Voltage Clamping Encoding

Figure 10:
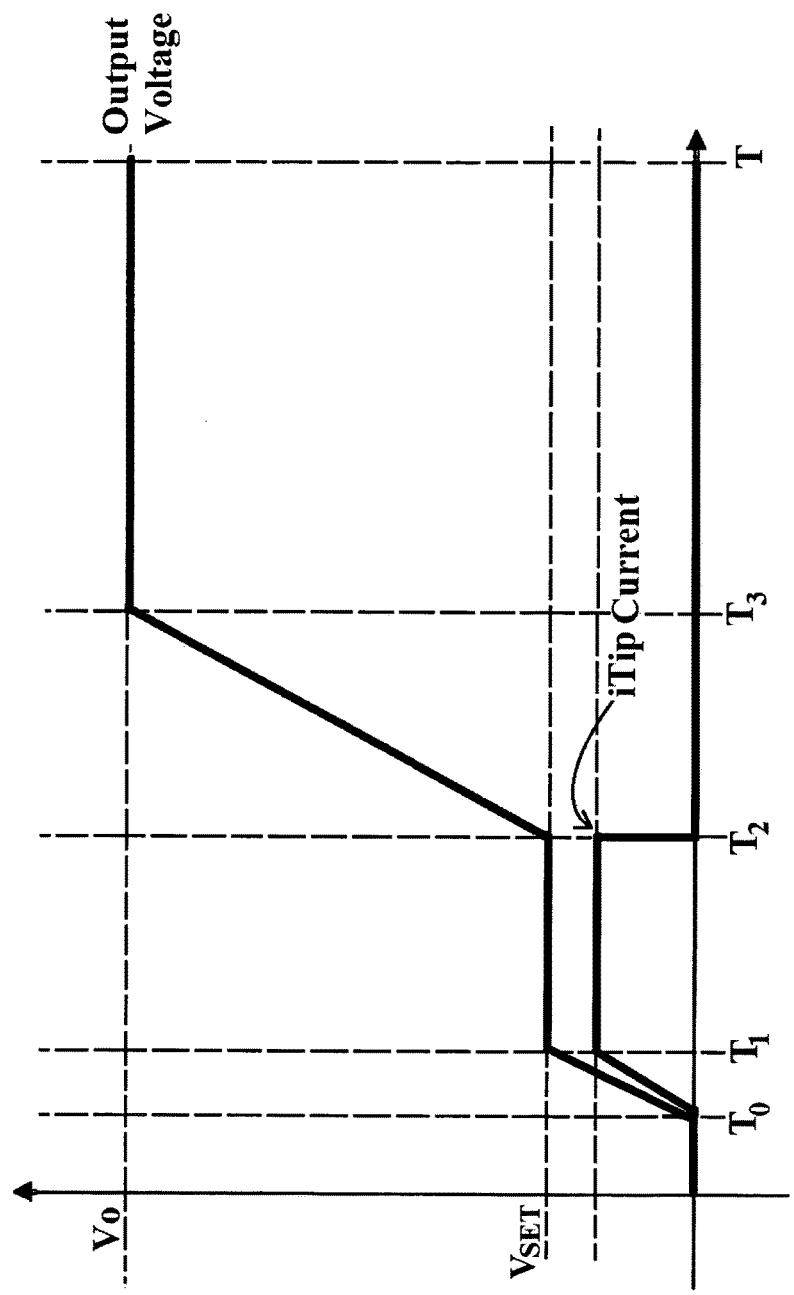
FIG. 10 schematically presents the PSU voltage and current when iTip is transferring one or more characteristics information base on the voltage amplitude set by iTip while PSU is set at a low power limit.

FIG. 10 schematically presents the PSU voltage and current when iTip is transferring one characteristic information base on the voltage amplitude set by iTip. A limited power capability from PSU is activated in order to help with the output voltage clamping. The clamping voltage level VSET is decoded by PSU as a target characteristic. At T2 the clamping is terminated by the iTip and PSU is raising the output voltage to the target level. The duration of the clamping can be use as a second characteristic information as described in the section above subtitled "Time encoding".

Figure 11:
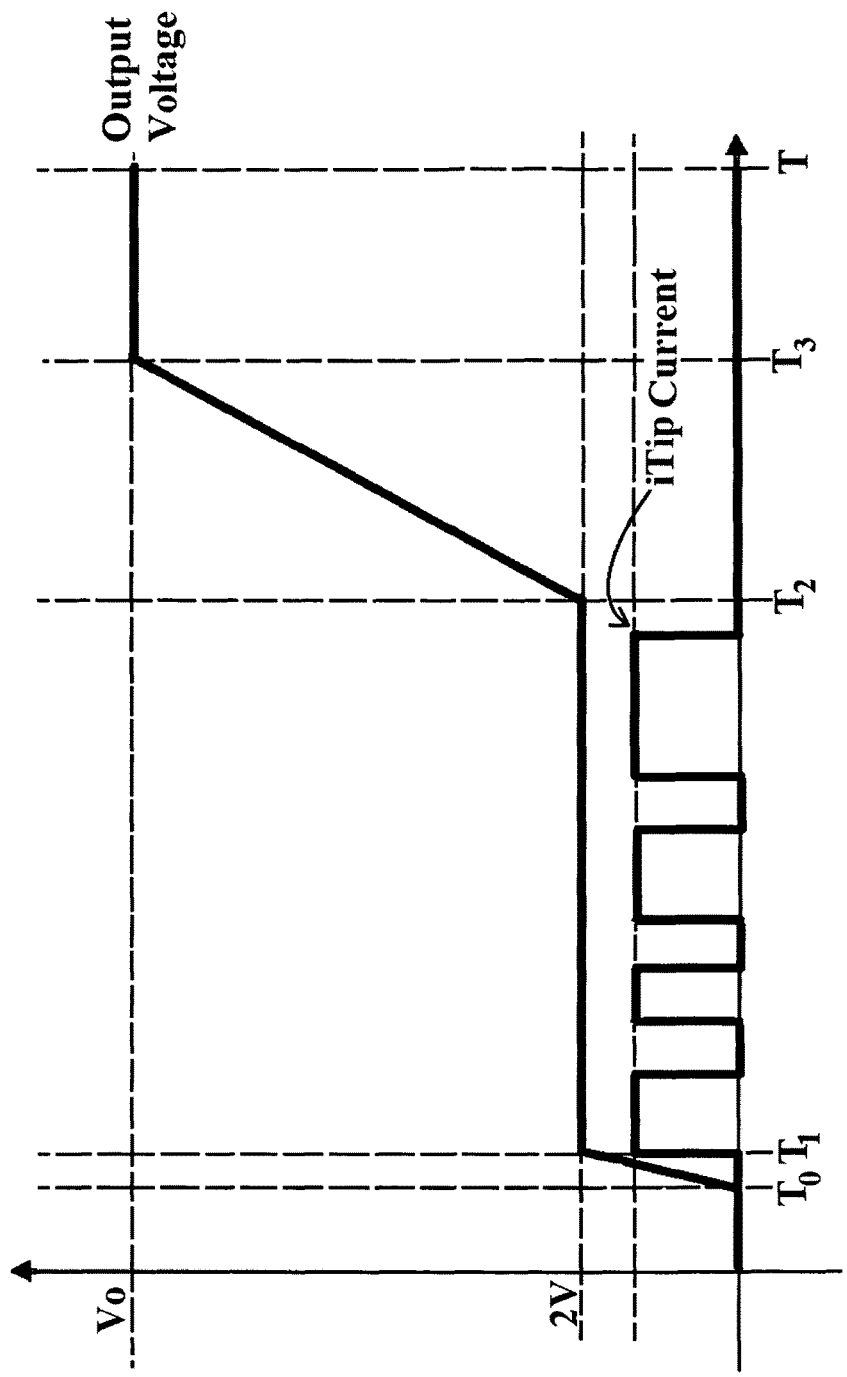
FIG. 11 schematically presents the PSU voltage and current when iTip is transferring one or more characteristics information base on a digital code pattern.

FIG. 11 schematically presents the PSU voltage and current when IPT is transferring one or more characteristics information base on a digital code pattern. As shown in FIG. 11, during T1-T2 interval, the iTip generates a modulated load current based on a digital code. The iTip may incorporated a microcontroller or/and a memory IC in order to produce such a digital data transfer.

Prior art (U.S. patent application Ser. No. 12/772,165) proposes a digital communication between PSU and an intelligent load by means of a dedicated third wire and classical digital voltage signal. The communication is bidirectional and continues during the operation of the load device. In the present method the digital communication is reusing the power wires, is preferably unidirectional, and takes place only when the load device is inactive and it is achieved through current signal.

Thus, as seen from the foregoing description, the present invention provides a load communication device that identifies and transmits to a PSU the load requirement to operate a load device that is powered by the PSU, by analyzing the characteristics of current applied to the load device by a given input voltage generated by the PSU. The load communication device is configured to transmit between the PSU and the load device solely over the 2 wire cable that extends between the PSU and the load device.

Additional features of the invention are described herein.

Maximum Voltage Clamping Encoding

Figure 12:
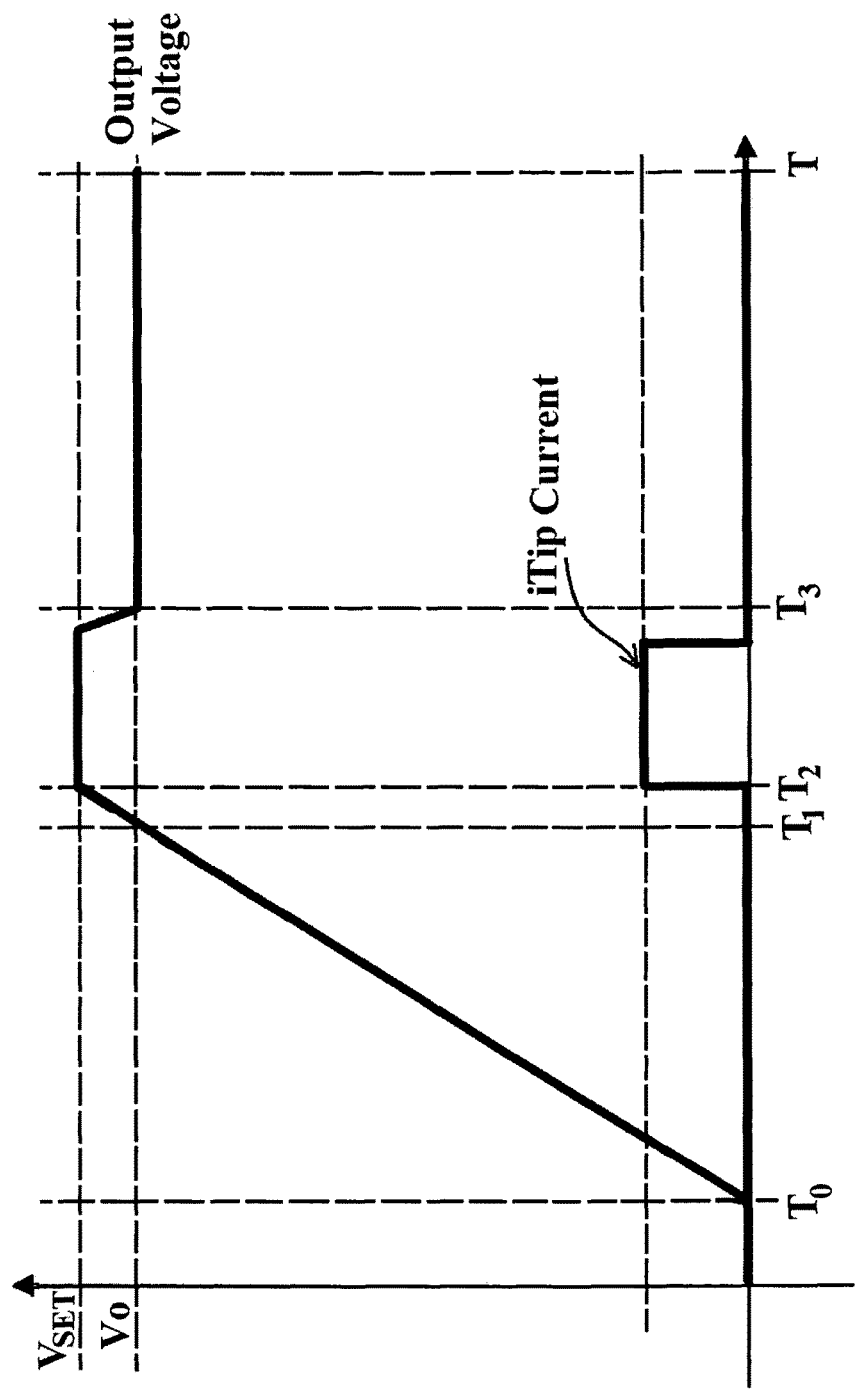
FIG. 12 schematically presents the PSU voltage and current when iTip is transferring one characteristic information base on the maximum voltage amplitude set by iTip.

There are some load devices on today's consumer market that have the internal battery exposed to input; therefore a significant voltage level is presented all the time on the input port. In such cases the low voltage generated by the power supply in order to communicate with the iTip is overwritten by the back bias voltage from the internal battery. The communication between iTip and the power supply cannot have place based on the method described previously (e.g. in the sections identified above as "Time encoding", "Frequency encoding", "Current amplitude encoding" and "Voltage clamping encoding"). FIG. 12 presents the PSU voltage and current when iTip is transferring one characteristic information base on the maximum voltage amplitude set by iTip. As shown in that figure, the clamping voltage level VSET is decoded by PSU as a target characteristic. VSET is in this case set slightly above the nominal output voltage (but still in the working input range of the load), therefore any voltage leaking from the internal battery do not affect the communication. At T1 the PSU voltage exceeds the desired nominal output voltage and at T2 it reaches the clamping VSET level when the iTip is raising its current, clamping the PSU output voltage (power limit). The clamping voltage level of iTip communicates to the PSU the desired output voltage and PSU output goes there, exiting the clamping range of the iTip at T3, the iTip current goes to zero at T3 and the PSU is working at the desired output voltage.

Output Voltage Back-Bias Protection

Figure 13:
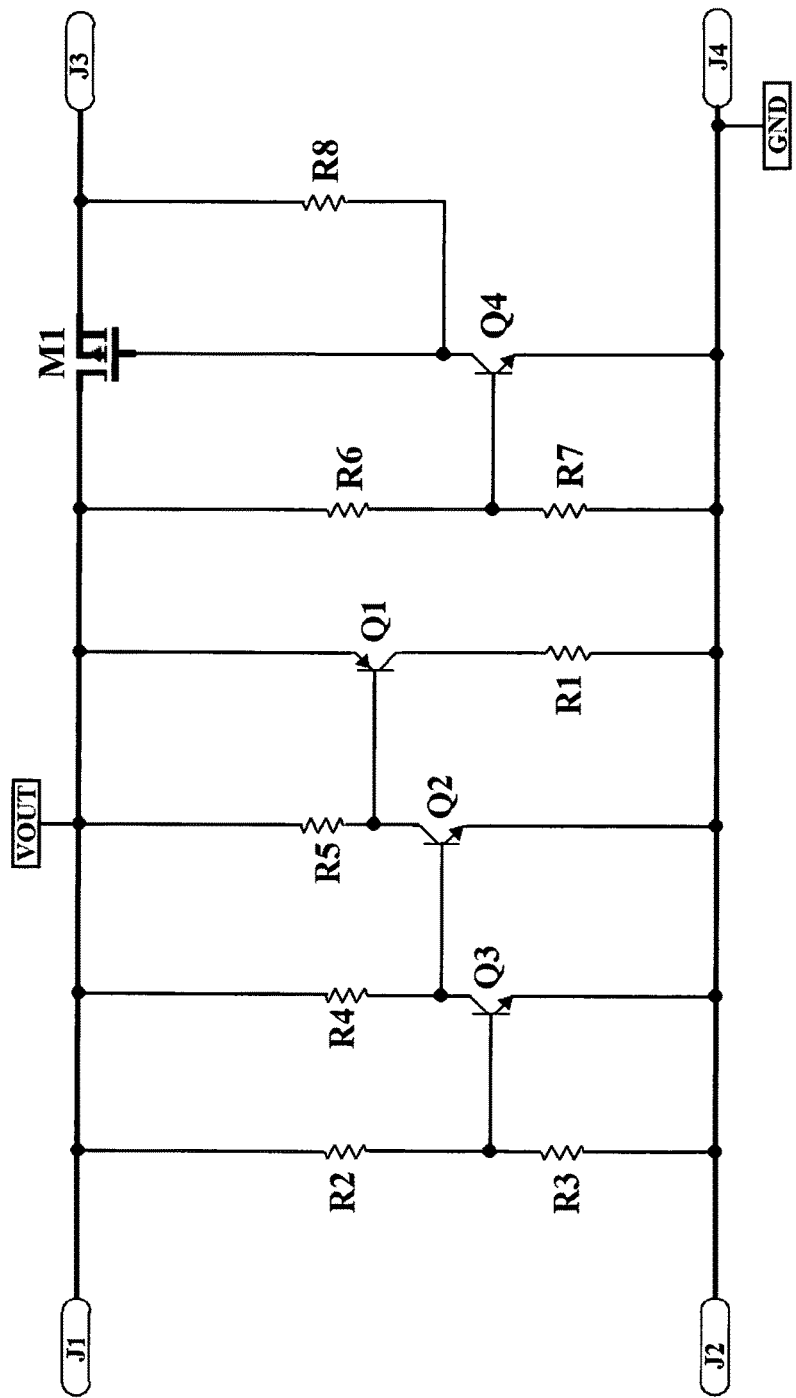
FIG. 13 shows a circuit implementation of an electronic switch (M1) for circuitry shown in FIG. 9 (current amplitude encoding).

In case of back bias from the battery of the load the communication between iTip and the power supply cannot have place based on the method described previously (e.g. in the sections identified above as "Time encoding", "Frequency encoding", "Current amplitude encoding" and "Voltage clamping encoding"). One way the overcome this issue is the addition inside of the iTip of a back-bias blocking switch. FIG. 13 shows an implementation of such electronic switch (M1) for circuitry shown in FIG. 9 (current amplitude encoding). In FIG. 13, M1 mosfet is normally OFF, disconnecting PSU output from the load (inside of iTip). Any back bias voltage from the battery of the load does not interfere with the iTip. M1 is controlled by transistor Q4, which is off for the low bias voltage applied by PSU. The current amplitude circuit of iTip works as described in the foregoing section entitled "Current amplitude encoding". Once the bias voltage is applied from PSU, transistor Q2 is turn on by the current injected in its based by R4. The Q2 collector current is polarizing the base-emitter junction of Q1, therefore Q1 is on in a saturated state. Its collector current is limited by resistor R1. Hence the current amplitude sink from PSU is controlled by R1. As long as the PSU voltage maintains the low bias voltage Q3 is off, because R2 and R3 are chosen to deliver a base voltage lower than the activation level. After the PSU has received the information encoded in the (current amplitude encoding) current, its voltage is rising in order to reach the target demanded for the load device (after T2). At T3 the PSU voltage has increased enough for the base voltage of Q3 to become active. As PSU output voltage continues to increase. Q3 becomes more active, its collector current reducing the base current of Q2, consequently reducing the collector current of Q1 (T3-T4). At the moment T4 the current through Q1 becomes zero; the only remaining current flowing through IPT is that of Q3, which is negligible.

Figure 14:
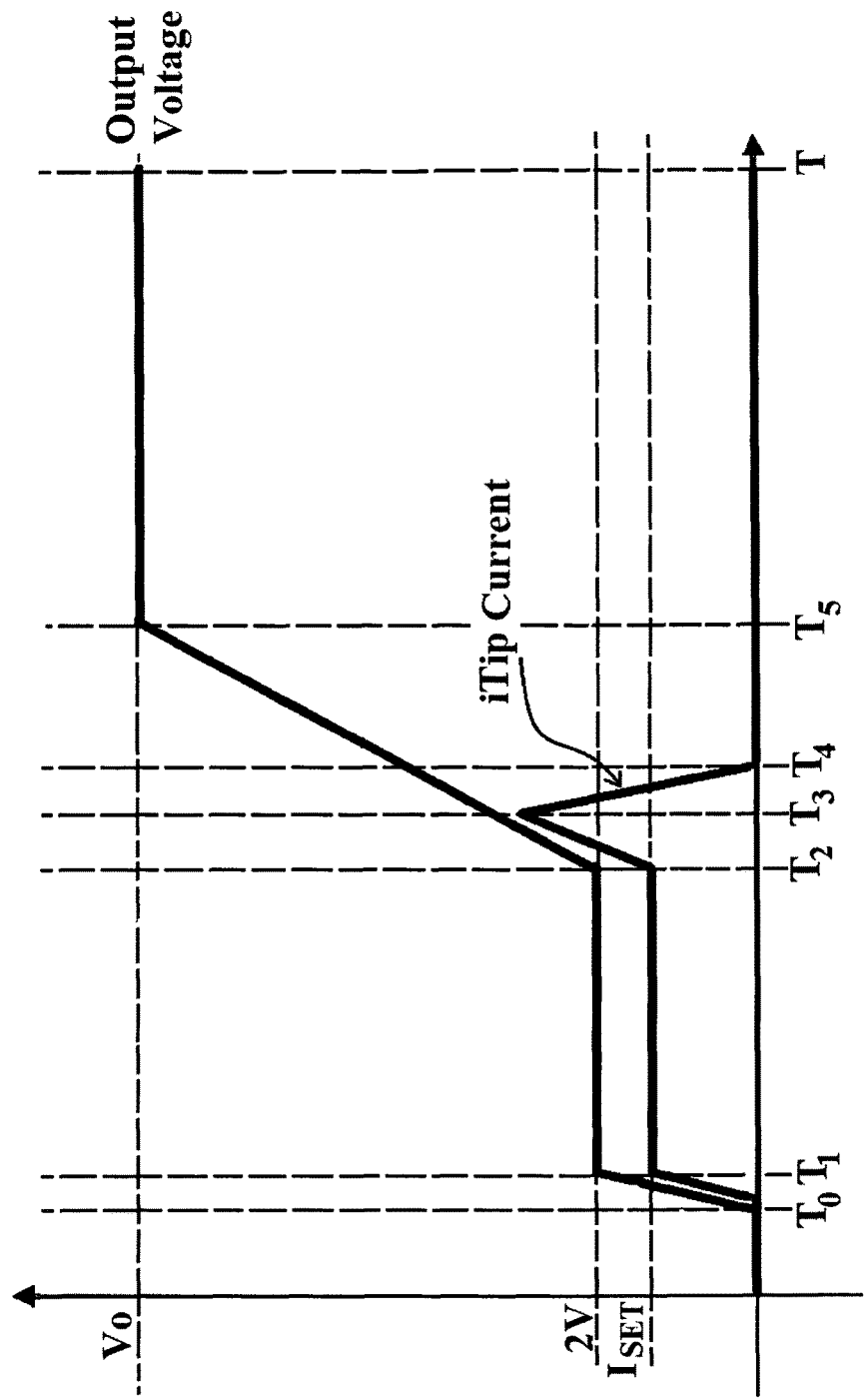
FIG. 14 schematically illustrates how PSU output rises to the desired target, in accordance with the principles of the present invention (using the circuitry of FIG. 13)

The PSU output rises to the desired target, process during which the Q4 is activated based on R6 and R7 resistor divider, when output voltage exceeds VON. Once Q4 saturates the gate of M1 is pulled down and M1 is activated, connecting the output of PSU to the load (T5), as schematically shown in FIG. 14.

High Frequency Filtered Communication

Figure 15:
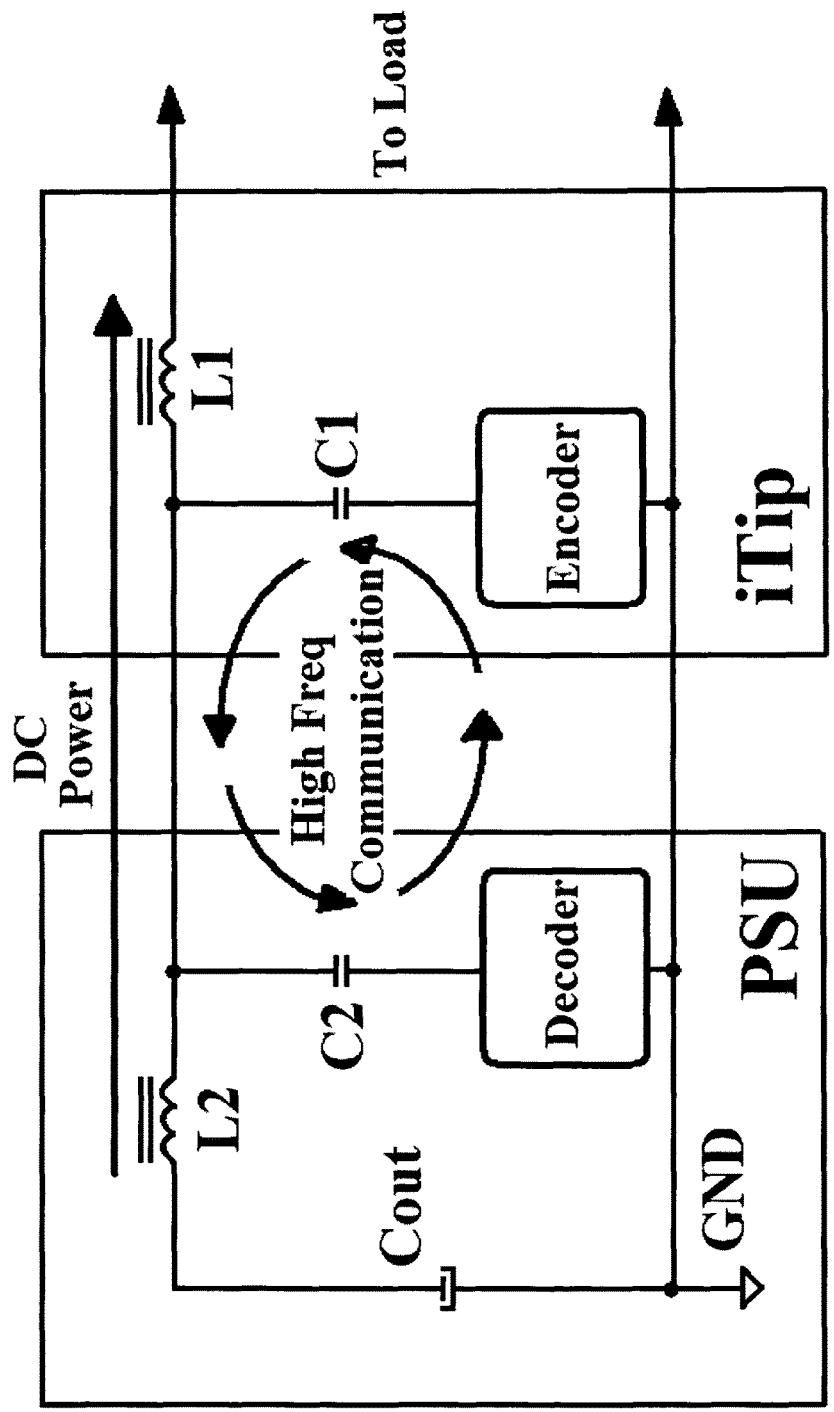
FIG. 15 schematically illustrates an example of high frequency communication between iTip and PSU independent of the DC voltage level present on the 2-wire cable, in accordance with the principles of the present invention

FIG. 15 schematically presents the high frequency communication between iTip (by means of analogue or digital encoding) and PSU independent of the DC voltage level present on the 2-wire cable. The iTip includes a high frequency reject filter at the load end while the PSU has a similar filter at its output. L1 and L2 are low frequency pass filters that allow only the DC power current to circulate between the PSU and load. C1 and C2 are high frequency filters that allow only the communication signal to pass between encoder circuit of the iTip and the decoder circuit of the PSU. The encoder and decoder are biased from the 2-wire power connection and are processing high frequency low power signal, using analogue or digital signal. The PSU output voltage is low compared to the load operation voltage and no power is drawn by the load. The communication is not compromised when the load presents a back bias voltage from the battery of the load. After the PSU acquires the target output voltage from the iTip, the output voltage of PSU rises to the desired voltage level and power transfer to the load can commence, while the communication from the iTip can be terminated.

Further Comment

Figure 16:
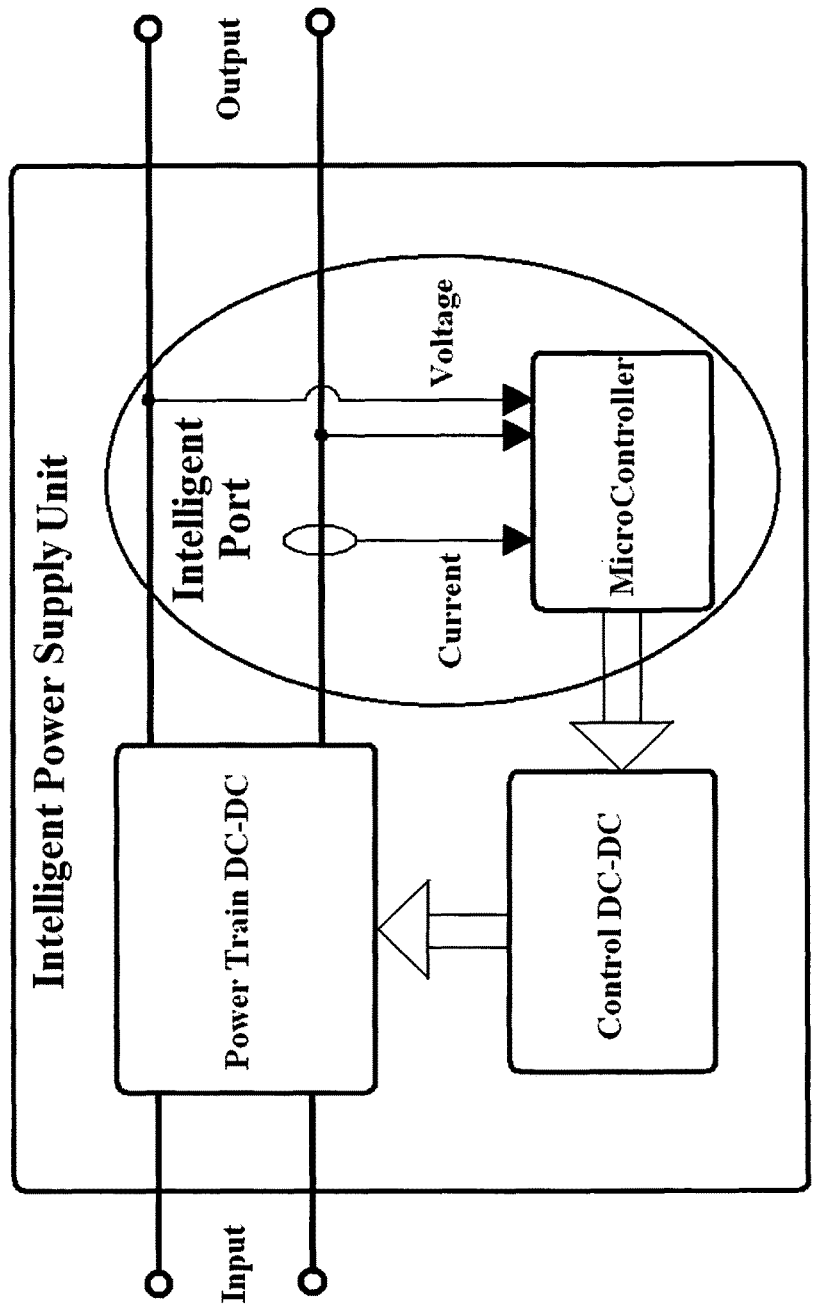
FIG. 16 is a schematic illustration of an intelligent PSU that may be used for information transfer, in a system and method according to the principles of the present invention.

FIG. 16 is a schematic illustration of an intelligent PSU that may be used for information transfer, in a system and method according to the principles of the present invention. Specifically, FIG. 16 is a schematic illustration of a PSU that may have a degree of intelligence, in the sense that it would be capable of identifying a load based on a stored load library (in its microcontroller). Such a PSU could be used in the system shown in FIG. 2, because it would still operate on the same 2 wire cable that transmits the power between the PSU and load. The load communication device would still comprise the iTip (e.g. the iTip forming the load port in the example of FIG. 2), so that each of the load and the PSU would have "smart" circuitry capable of communication.

SUMMARY

The foregoing description shows how the principles of the present invention can be implemented to provide for transferring information between PSU and load devices by electrical means, without using any supplementary electrical connection but the power wires (e.g. the 2 wire cable that extends between the PSU and the load devices). With the foregoing description in mind, the manner in which the principles of the present invention can be implemented for various types of PSU and load devices will be apparent to those in the art.

The invention claimed is:

1. Apparatus for operating a load device powered by a power supply unit (PSU) comprising: a load communication device that identifies and transmits to the PSU a load requirement to operate the load device that is powered by the PSU, said load requirement being identified by analyzing the characteristics of current applied to the load device by a given input voltage generated by the PSU, wherein the apparatus is adapted to identify the load requirement in the form of a suitable voltage level for the load device by applying successive standard voltage levels with a zero voltage reset in between, the standard voltage levels being applied for a period of time long enough to address a transient behaviour of load current and by identifying one or more patterns of the load current in order to identify the load requirement.

2. The apparatus of claim 1, wherein the load communication device is configured to transmit between the PSU and the load device solely over a 2 wire cable that extends between the PSU and the load device.

3. The apparatus of claim 2, where the load communication device is in circuit communication with the PSU during low state voltage and is configured to transfer one, or a plurality of, load characteristics.

4. The apparatus of claim 2, where the load communication device is physically outside of the PSU and communicates with the PSU during a high voltage state of the PSU output by clamping the maximum output voltage of the PSU.

5. The apparatus of claim 2, where the load communication device is in circuit communication with the PSU during a low state voltage of the PSU output and the communication during the low state voltage is protected by a switch against a back bias voltage of the battery of the load.

6. The apparatus of claim 2, where the load communication device is in circuit communication with the PSU during the low state voltage and the communication during the low state voltage is done by means of high frequency filtered path while the power transfer between PSU and load is done by means of low frequency filtered path using the same 2-wire cable.

7. The apparatus of claim 2, wherein the load communication device comprises a current amplitude encoding circuit which comprises: a first bipolar junction transistor (BJT), a second BJT, and a third BJT; and wherein a base terminal of the first BJT is connected with a collector terminal of the second BJT, and a base terminal of the second BJT is connected with the collector terminal of the third BJT.

8. The apparatus of claim 7, further comprising a normally-off MOSFET connected with an emitter terminal of the first BJT for protecting against a back bias voltage from the load device.

9. The apparatus of claim 2, where the load communication device has a stored library of voltage-current-time characteristics for different load devices that is used to identify the actual load device.

10. The apparatus of claim 2, where the load communication device is physically outside of the PSU and communicates with the PSU during a low voltage state of the PSU output.

11. The apparatus of claim 1, where the load communication device is physically outside of PSU and communicates with the PSU during the low voltage state of the PSU output.

12. The apparatus of claim 1 where the load communication device is in circuit communication with the PSU during the low state voltage by coding the data in analogue and/or digital format.

13. The apparatus of claim 1 where the load communication device is in circuit communication with the PSU during the low state voltage using any or all of voltage, current, time and frequency.

14. The apparatus of claim 1, where the load communication device is physically outside of the PSU and communicates with the PSU during the high voltage state of the PSU output by clamping the maximum output voltage of the PSU.

15. Method for identifying and transmitting to a power supply unit (PSU) a load requirement to operate a load device that is powered by the PSU, comprising
  a) providing communication between a load communication device and the PSU, and, for identifying the load requirement, the load communication device analyzes the characteristics of current applied to the load device by a given input voltage generated by the PSU, and
  b) the load communication device transmitting to the PSU the load requirement to operate the load device that is powered by the PSU,
    wherein the load requirement in form of a suitable voltage level for the load device is identified by applying successively standard voltage levels with zero voltage reset in between, the standard voltage levels being applied for a period long enough to address a transient behaviour of a load current, and by identifying patterns of the load current.

16. The method of claim 15, wherein the load communication device transmits between the PSU and the load device solely over a two-wire cable that extends between the PSU and the load device.

17. The method of claim 16, where the load communication device has a stored library of voltage-current-time characteristics for different load devices that is used to identify the actual load device.

18. The method of claim 16, where the load communication device is physically outside of PSU and communicates with the PSU during a low voltage state of a PSU output.

19. The method of claim 16, where the load communication device is in circuit communication with the PSU during low state voltage and transfers one, or a plurality of, load characteristics.

20. The method of claim 16, where the load communication device is physically outside of PSU and communicates with the PSU power supply unit during a high voltage state of a PSU output by clamping a maximum output voltage of the PSU.

21. The method of claim 16, where the load communication device is in circuit communication with the PSU during low state voltage and the communication during low state voltage is protected by a switch against a back bias voltage of a battery of the load device.

22. The method of claim 16, where the load communication device is in circuit communication with the PSU during low state voltage and the communication during low state voltage is done by means of a high frequency filtered path while a power transfer between PSU and load device is done by means of a low frequency filtered path using the same two-wire cable.

* * * * *